United States Patent [19]
Petrie

[11] 4,184,242
[45] Jan. 22, 1980

[54] BEVELED RETAINING RING AND METHOD FOR CONSTRUCTING THE SAME

[76] Inventor: John A. Petrie, 431 Brainard Pl., Bldg. 29001 Cedar Rd., Cleveland, Ohio 44124

[21] Appl. No.: 882,637

[22] Filed: Mar. 2, 1978

[51] Int. Cl.² ...................... B21D 53/16; B21D 53/36
[52] U.S. Cl. .................................. 29/400 R; 72/340; 140/88
[58] Field of Search .......................... 72/340; 10/86 B; 29/400 R, 400 D, 156.6, 156.63, 172; 51/290; 140/82, 88; 24/256

[56] References Cited

U.S. PATENT DOCUMENTS

| 849,329 | 4/1907 | Colthar | 76/101 A |
|---|---|---|---|
| 3,232,088 | 1/1966 | Newcomer, Jr. et al. | 140/88 |
| 3,561,087 | 2/1971 | Koehler | 29/156.6 |

*Primary Examiner*—Michael J. Keenan
*Attorney, Agent, or Firm*—Maky, Renner, Otto & Boisselle

[57] ABSTRACT

A split beveled retaining ring and method for constructing the same is characterized by a beveled groove seating flange being formed by bending the radially inner or outer edge portion of a split ring body at an angle to the plane of the ring body. A grinding operation may be employed to remove protruding material from the bent annular flange on the side of the ring opposite the groove seating surface thereon to provide a flat bearing shoulder normal to the ring axis while permitting enough of the beveled flange to be received in the groove for safe part retention. Alternatively, the part abutment surface of the ring body may be maintained in substantially the same plane as the terminal portion of the bent beveled flange either by indenting the ring body to form a new part abutment surface or by bending the groove seating flange twice in opposite directions.

11 Claims, 19 Drawing Figures

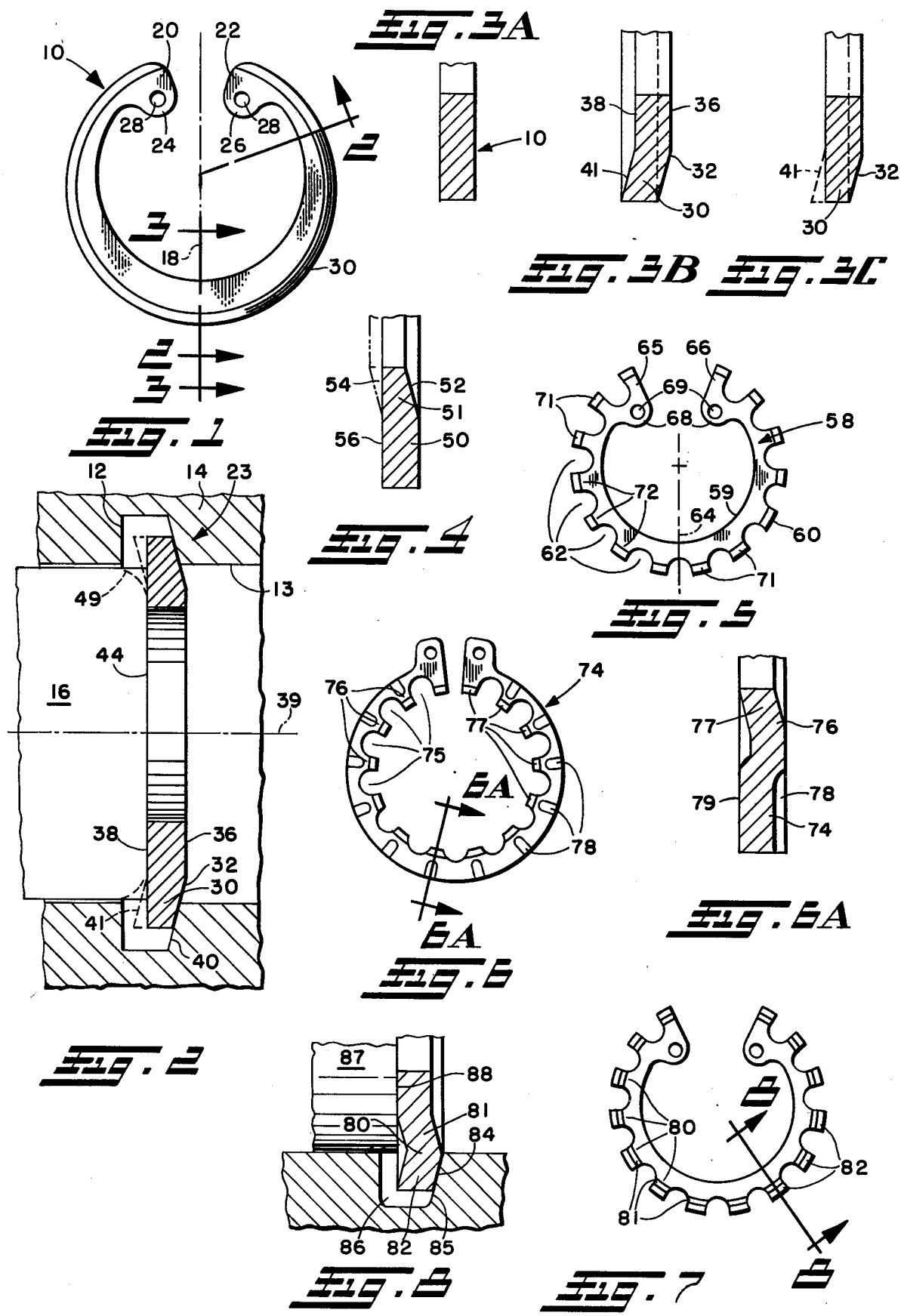

BEVELED RETAINING RING AND METHOD FOR CONSTRUCTING THE SAME

BACKGROUND OF THE INVENTION

This invention as generally indicated above relates to split, beveled retaining rings and their method of manufacture.

Split beveled retaining rings are used to provide rigid end-play takeup in machine assemblies and other applications where manufacturing tolerances and/or part wear cause end-play between the abutting surfaces of the ring and the retained part. Such a ring is similar to a standard retaining ring except that a surface portion thereof received in the groove is beveled, usually to a 15° angle. The ring retention groove has a corresponding bevel on the load bearing groove wall to seat the received beveled surface, and the beveled ring surface is generally seated at least half way into the groove to provide sufficient contact area with the load bearing groove wall while allowing for adequate end-play takeup.

Beveled retaining rings may be of the internal or external type with the beveled edge located around the outer circumference of the former and around the inner circumference of the latter. Usually, the rings are of the tapered section type such as shown in U.S. Pat. No. 2,509,081 to Bluth, so that they maintain their circularity under deformation. Such tapered rings may also have bent prongs abutting the retained part to exert spring pressure thereagainst as shown in German Pat. No. 852,319.

Heretofore, the beveled groove seating surface of the ring was produced, for example, by holding the ring in an appropriate fixture and then using a surface grinder to obtain the desired beveled profile. However, currently such beveled rings are produced through a coining operation which requires substantial technical expertise and capital investment. In either case, such methods have proved to be relatively slow and expensive.

SUMMARY OF THE INVENTION

The principal object of the present invention is to eliminate the coining or bias grinding procedures by forming a beveled or inclined groove seating flange of the ring by bending or stamping the circular edge of a flat, split, tapered section ring body at the desired inclined angle to the plane of the ring. Preferably the ring is formed in its unhardened state and is subsequently hardened by heat treating. Such a ring may be used with retained parts having a radius or chamfer to allow the retained part to clear the protruding annularly bent flange on the side of the ring opposite the groove seating surface while abutting the planar shoulder of the ring body.

In accordance with another aspect of the principal object of the present invention, the formed-bevel ring may be ground to remove the protruding or surplus material from the bent flange on the side opposite the groove seating surface to provide a radially continuous planar surface for abutting the retained part, which now need not employ a radius or chamfer. The removal of the surplus material is accomplished by grinding the ring normal to its axis along the full radial extent of the flange. Furthermore, the ring may be thus ground in its finished heat-treated state to minimize distortion and then immediately stacked or orientated after grinding.

The finished beveled rings may be put through a further cleaning operation and then treated with oil preservatives and rust inhibitors if desired.

In accordance with still another aspect of the principal object of the present invention, the radially inner or outer body edge portion is bent twice in opposite directions so that the terminal portion thereof lies substantially in the plane of the ring body surface abutting the retained part. Such double bend eliminates the need for a subsequent grinding operation because the resulting beveled edge received in the groove does not project beyond the plane of the ring body abutting the retained part, thus preventing interference between the outer bent flange and the retained part. Alternately, the ring body may be indented to form a part bearing surface that is coplanar with the terminal portion of the bent beveled flange, thereby similarly to eliminate the need for a subsequent grinding operation.

It is another object of the present invention to provide a ring of uniform section from end to end having a scalloped profile thereon to maintain its circularity under deformation. To this end, the scalloped profile is formed by a plurality of circumferentially spaced grooves along the periphery of the ring, which progressively increase in depth from the middle section to the free ends of the ring, with such grooves maintaining the ring circularity under deformation instead of the standard tapered body cross section for such purpose. The prongs between the semicircular grooves are bent to the desired angle to form the beveled flange, which may be subsequently ground as described above, if required. This type of beveled ring not only facilitates high speed production and reduction of cost, but greatly reduces tool wear and design problems.

It is still another object of the present invention to make a beveled ring by bending the body thereof through its entire cross section to the desired bevel angle to form the same into a dish or cup shape. The excess material may then be removed from one side or both sides of the cup shaped ring body by grinding the same normal to its axis to provide a planar part abutting shoulder opposite the groove seating surface and, if desired, a planar face adjacent the inclined groove seating surface. Preferably, the part is ground on both sides so that equal amounts of material are simultaneously removed from the cup shaped ring body. Accordingly, stock removal may be quickly and economically achieved by double disc grinding which also yields particularly flat surfaces.

Other objects and advantages of the present invention will become apparent as the following description proceeds.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE DRAWINGS

In said annexed drawings:

FIG. 1 is an elevation of an internal, split beveled retaining ring constructed in accordance with the present invention;

FIG. 2 is a section of a typical part retaining assembly incorporating the split beveled retaining ring shown in FIG. 1, with the section of such ring being taken along section line 2—2 of FIG. 1;

FIGS. 3A, 3B and 3C are fragmentary sections taken at a position corresponding to section line 3—3 in FIG. 1 sequentially illustrating the method of making the beveled retaining ring shown in FIG. 1 wherein FIG. 3A depicts a standard flat tapered section ring prior to forming the groove seating surface, FIG. 3B depicts the ring after bending out before removing the protruding portion of the bent flange, and FIG. 3C depicts the finished ring after the protruding portion has been removed by grinding;

FIG. 4 is a fragmentary section similar to FIG. 3B showing an external beveled retaining ring constructed in accordance with the present invention;

FIG. 5 is an elevation of an internal beveled retaining ring of another type having a scalloped profile with bent intermediate prongs to form the beveled flanges received in the groove;

FIG. 6 is an elevation of an external, split beveled retaining ring employing the scalloped profile and an indented ring body to form a new part abutment surface;

FIG. 6A is a fragmentary section taken along the plane 6A—6A in FIG. 6 showing the coplanar orientation of the terminal portion of the beveled flange and the indented part abutment surface;

FIG. 7 is an elevation of the dual bend, split bevel retaining ring constructed in accordance with another embodiment of the present invention;

FIG. 8 is a section of a typical part retaining assembly incorporating the dual bend, split bevel retaining ring of FIG. 7, with the section of such ring being taken along section line 8—8 of FIG. 7;

FIGS. 11A, 11B, 11C are fragmentary sections taken at a position corresponding to the line 11—11 of FIG. 9 sequentially showing the method of making the beveled retaining ring of FIG. 9 wherein FIG. 11A depicts a split, tapered section ring body prior to bending the ring across its entire radial section, FIG. 11B depicts the cup shaped ring after bending but before grinding, and FIG. 11C depicts the finished beveled ring after grinding;

DESCRIPTION OF THE PREFERRED EMBODIMENTS

Figure 10:
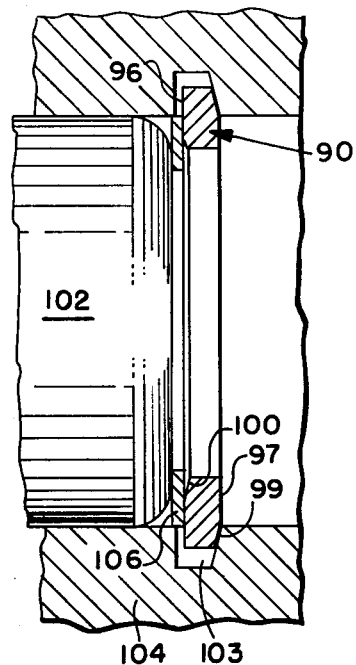
FIG. 10 is a section of a typical part retaining assembly using the beveled retaining ring of FIG. 9, with the section of such ring being taken along the line 10—10 of FIG. 9.

Referring now in greater detail to the drawings and initially to FIGS. 1 and 2, an internal beveled retaining ring indicated generally at 10 is adapted to be sprung into an inwardly opening groove 12 in bore 13 of a housing 14. The beveled retaining ring 10 is made from an open-ended or split ring body constructed from spring material such as spring steel, the section heights of which progressively decrease from its middle section 18 to its free ends 20 and 22. Such free ends 20 and 22 are provided with inwardly projecting lugs 24 and 26, respectively, each of which has an aperture 28 for receiving the points of a tool operative to close the ring and reduce its diameter so that it may be slipped within housing bore 13 adjacent the end of retained part 16 and then released by the tool naturally to spring into housing groove 12. Due to the taper afforded by the progressively decreasing section heights, the ring 10 maintains its circularity under deformation.

The ring 10 has a beveled or inclined radially outer flange 30 which has at one side thereof the inclined groove seating surface 32 of the ring. Customarily, the surface 32 is at a 15° angle relative to the planar sides 36 and 38 of the ring body, which sides are substantially normal to the ring axis 39.

Upon tool release, seating surface 32 of the ring abuts annular load bearing wall 40 of the groove 12, with such groove wall 40 being inclined at the same angle of inclination as the inclined surface 32 of the ring to form complementary abutting surfaces. Accordingly, the ring 10 acts as a wedge between the groove wall 40 and the retained part 16. Moreover, the thickness and diameter of the ring and the width of the groove are so dimensioned that the ring is stressed to a diameter less than its normal or unstressed diameter to which it tends to spread. Thus the ring's spring action causes the ring to seat more deeply in the groove compensating for end-play.

Heretofore, the inclined surface 32 was either bias ground on the ring 10 or it was formed thereon by a coining operation. However, in accordance with the present invention, the inclined groove-engaging surface 32 may be formed initially by bending the radially outer circular edge portion of the flat spring ring body (FIG. 3A) to the desired angle illustrated in FIG. 3B. Preferably, the bent or beveled flange 30 is about one-third the radial extent of the ring at its greatest section height. Such bending may be accomplished, for example, by stamping the ring, preferably in its unhardened state, between suitable dies. The ring may then be hardened, as by heat-treating, to obtain the desired properties.

It will be appreciated that the ring of FIG. 3B may be used without further processing in certain situations. Because the optimum tolerance take-up situation occurs when the bent flange 30 is at least half way into the groove 12 to provide sufficient ring seating area and spring flexure freedom, the surface 41 of the bent flange 30, as illustrated in phantom in FIG. 2 and in solid in FIG. 3B, interferes with the retained part 16 to preclude the lead face 44 thereof from abutting the part retaining surface 38 of the ring body. To overcome this interference, the retained part may have a peripheral radius or chamfer 49 (shown in phantom) to insure clearance between the part 16 and the protruding side 41 of the bent flange 30, thereby to permit the leading face of the part to abut the part retaining surface 38 of the ring body.

As an alternative to the part chamfer 49, the ring 10 may instead be ground to remove the protruding flange material which projects beyond the plane of part retention surface 38 of the ring body, thereby to provide a planar face (FIG. 3C) normal to the axis of the ring over the full radial extent of the ring. As shown by the phantom lines of FIG. 3C, this grinding operation requires only the removal of the relatively small amount of material by grinding the ring normal to its axis 39. The ring body as thus bent and ground may then be installed in the housing groove 12 to complete the part retaining assembly 23 as illustrated in full lines in FIG. 2, with the planar or flat part abutment surface 38 engaging and retaining the part 16 without interference.

The rings may be thus ground in their finished heat-treated state to reduce potential manufacturing distortion of the rings, and the finished rings leaving the grinding equipment may be immediately stacked or oriented on rods or the like to facilitate handling and storage. The finished rings may be put through a further cleaning treated with oil preservatives and rust inhibitors if desired.

FIG. 4 shows a section similar to that of FIG. 3C of a tapered-section external, split beveled retaining ring 50 adapted to be sprung into an outwardly opening groove on a shaft or the like. External beveled ring 50 is similar to the internal ring of FIGS. 1–3 but is provided with a bent flange 51 at its radially inner edge to define a beveled groove seating surface 52. As with the internal ring of FIGS. 1–3, interfering portion 54 of bent flange 51 may be removed by grinding normal to the axis of the ring to provide a radially continuous planar part abutment surface 56.

Referring now to FIG. 5, an internal retaining ring body 58 is provided initially having uniform section height from end to end between concentric radially inner and outer arcuate edges 59 and 60, respectively. The ring body 58 has a scalloped profile formed by a plurality of circumferentially spaced, semicircular grooves 62 along the radially outer edge 60, such grooves 62 progressively increasing in depth from the middle section 64 to its free ends 65 and 66. Because of the variation in groove depth, which is uniformly increasing on both sides of center line 64, the ring 58 maintains its circularity under deformation similar to the tapered ring 10 of FIG. 1. The free ends of the ring 65 and 66 are provided with inwardly projecting ears 68 with apertures 69 to facilitate insertion and removal of the ring.

Such scalloped profile ring body may be subjected to the same forming process described above in context with FIGS. 3A, 3B and 3C. Specifically, a scalloped profile ring body may have formed thereon the beveled groove seating surface 71 by simultaneously bending each of the prongs 72 between the semicircular grooves 62 to the desired angle. Such beveled ring may be used without further processing or may be subjected to the grinding process described above to remove the interfering material thereon.

In FIG. 6 and 6A, an external retaining ring 74 similar to that illustrated in FIG. 5 includes a scalloped profile at the radially inner side thereof formed by a plurality of circumferentially spaced semicircular grooves 75 of increasing depth from the centerline to the free ends. The prongs 76 between grooves 75 are simultaneously bent to the desired angle to form the groove seating flanges 77. To avoid grinding such flanges, the ring body may be provided with a plurality of circumferentially spaced indentations 78 which form substantially coplanar projecting surfaces 79 at their part retaining side with the terminal portions of the groove seating flanges. The retained part may thus abut such projecting surface without interference from the unground bent prongs 76 forming the groove seating flanges 77.

As another means to avoid grinding, the prongs (or arcuate edge portion) may be bent twice in opposite directions so that the terminal portions of the prongs are coplanar with the ring body. As best shown in FIGS. 7 and 8 for an external ring, the circumferentially spaced prongs 80 are bent by stamping or the like in two directions to form a V-shape configuration having a first flange leg 81 and a second, rebent flange leg 82. The second leg 82 forms groove seating surface 84 that is in abutment with the complementary load bearing wall 85 of seating groove 86, with the dual bend permitting the flange to be inserted more than half way into the groove. As thus assembled, the inserted flange does not interfere with the retained part 87 because the terminal portion of second leg 82 is substantially coplanar with the part abutment surface 88 of the ring body.

Preferably, the dual bend flange ring has the scalloped profile shown on a uniform section ring since in most cases the standard tapered section ring does not have sufficient radial extent to permit a dual bend and still yield satisfactory bearing area. The scalloped profile ring having circumferentially spaced single or dual bend groove-engaging surfaces on each of the prongs has been found to provide satisfactory load capacity. In addition, the dual bend ring functions as a combination of resilient and rigid end-play take-up due to the possibility of the double bend area flexing under load.

Figure 9:
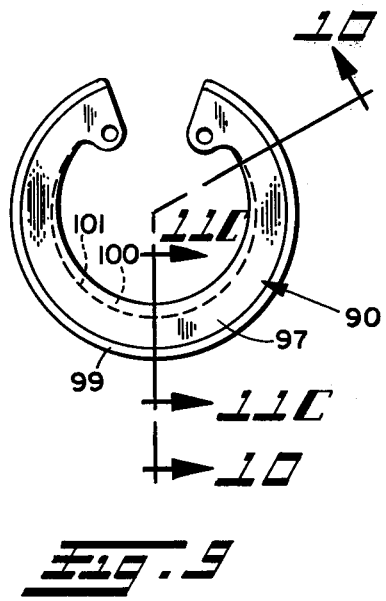
FIG. 9 is an elevation of an internal beveled retaining ring made by another method according to the present invention in which the ring body is initially bent across its entire radial cross section into dish shape and then ground normal to the ring axis as required.
Figure 11A:
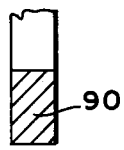
Figure 11B:
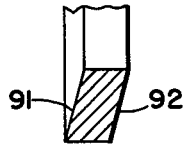

In FIGS. 9 through 11, a formed beveled ring 90 constructed in accordance with yet a further aspect of the present invention is illustrated. The ring 90 is constructed from a standard tapered section, split retaining ring body, which is bent through its entire cross section to the desired bevel angle as shown in FIG. 11B, thus giving the ring a cup or dish shape having inclined sides 91 and 92. The dish shape ring body is then subjected to a grinding operation to remove surplus material, designated by reference characters 94 and 95, from both sides of the dish shape ring body to provide parallel sidewalls 96 and 97 normal to the axis of the ring. The sidewalls 96 and 97 do not extend over the entire radial extent of the ring body, thereby providing a beveled groove seating surface 99 at the radially outer edge of the ring body. Similarly, an inclined surface 100 is provided at the radially inner edge portion of the ring body diagonally opposed from the groove seating surface 99. However, due to the tapered cross section of the body, inclined surface 100 becomes progressively radially smaller from the middle portion toward the free ends and therefore extends over only approximately two-thirds of the circumferential extent of the ring body as shown by dashed line 101 (see FIG. 9).

The two sided grinding operation may be readily achieved through double disc grinding which yields parallel sidewalls 96 and 97. The grinding wheels would be orientated normal to the axis of the rings as the rings are passed therethrough. Of course, the rings may be hardened by heat-treating after the forming process and before the grinding process. As the rings are removed from the grinding equipment, they can be conveniently stacked and orientated and subsequently cleaned and treated if desired.

Because of inclined surface 100, part retaining sidewall 96 (FIG. 10) has a smaller radial extent than conventional rings. In those applications where large radii and chamfer dimensions are present, such sidewall 96 may not be sufficient in radial extent adequately to retain the machine part 102 when such ring has been snapped into groove 103 in housing 104. In such case, the introduction of a sharp cornered annular washer 106 between the retained part 102 and the ring 90 will insure proper transmittal of the loads reliably to retain part 102.

Figure 11C:
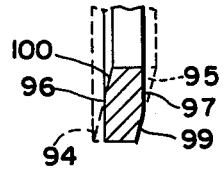
Figure 12:
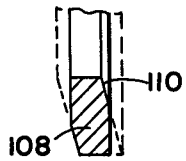
FIG. 12 is a section similar to FIG. 11C showing an external beveled retaining ring constructed in accordance with the method illustrated in FIGS. 11A, 11B and 11C.

FIG. 12 shows a section similar to that of FIG. 11C of an external retaining ring 108 adapted to be sprung into an outwardly opening groove of a shaft. Such open ended or split ring 108 is made in accordance with the method steps described in conjunction with FIGS. 9-11 but instead is provided with beveled groove seating surface 110 along its radially inner edge portion.

Figure 13:
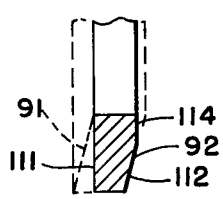
FIG. 13 is a section similar to FIG. 11C of an internal beveled ring with a planar shoulder across the full radial extent of the ring on the part abutment side and a planar face on the other side adjacent the groove-seating surface.
Figure 14:
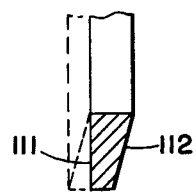
FIG. 14 is a section similar to FIG. 11C of a formed beveled retaining ring with a planar surface across the full radial extent of the ring on the part abutment side and with a beveled groove-seating surface across the full radial extent of the ring at the other side.

Although removing equal amounts of material from both sides of the dish shape body is preferred, FIGS. 13 and 14 show other method variations that may be employed. In FIG. 13, unequal amounts of material are removed from the two sidewalls 91 and 92 of the dish shape ring illustrated in FIG. 11B. The part abutment sidewall 111 opposite the beveled groove engaging surface 112 is ground normal to the ring axis to a sufficient extent to provide a flat abutment shoulder across the full radial extent of the ring. A lesser amount of material is removed from the opposite sidewall 92 to provide flat, normal face 114 adjacent groove engaging surface 112. Such a ring provides a larger shoulder surface for abutment with the retained part thus eliminating the need for a washer with parts having large radii or chamfers. Such rings, however, require a thicker flat retaining ring to accommodate the greater removal of material so that minimum edge thickness requirements can be maintained. Alternatively, no material need be removed from side 112 as shown in FIG. 14, the ring being ground only on the side 111. Accordingly, the inclined side 112 forms the groove seating surface which cooperatively abuts the inclined groove wall.

Other modes of applying the principle of the invention may be employed, change being made as regards the details described, provided the features stated in any of the following claims or the equivalent of such be employed.

I claim:

1. A method of forming a beveled split part retaining ring comprising the step of uniformly bending a radially inner or outer edge portion of the ring body relative to the plane of such body to form a beveled flange having an inclined groove seating surface, and removing limited amounts of material from the beveled flange on the side thereof opposite the inclined seating surface by grinding normal to the axis of the ring body.

2. The method of claim 1 further comprising the step of hardening the ring body material between the bending and grinding steps.

3. The method of claim 1 further comprising the step of initially forming a plurality of circumferentially spaced grooves along the radially inner or outer edge of a ring body having uniform cross section from end to end, said grooves increasing in depth from the center to the free ends, with the uniform bending then being performed on the prongs between the grooves.

4. A method of forming a beveled split part retaining ring comprising the steps of uniformly bending at least a portion of the ring body relative to the plane of such body to form a beveled flange having an inclined groove seating surface on one side of such body, and removing material from the other side of such body opposite the inclined seating surface by grinding normal to the axis of the body to form a planar abutment surface for part retention.

5. The method of claim 4 wherein such body is bent to the desired bevel angle at a radially inner or outer edge portion thereof.

6. The method of claim 4 wherein such body is bent to the desired bevel angle across its entire cross sectional shape.

7. The method of claim 6 wherein such other side of such body is ground normal to the axis of the body to a sufficient extent to provide a planar abutment surface across the full radial extent of such body.

8. The method of claim 7 wherein a lesser amount of material is ground from such one side of such body normal to the axis of such body to provide a flat normal face adjacent such inclined seating surface.

9. The method of claim 4 wherein material is ground from such one side of such body normal to the axis of such body to provide a flat normal face adjacent such inclined seating surface.

10. The method of claim 4 wherein the ring body is a split ring body having a circular, tapered cross section which during the initial bending step is bent across its entire cross sectional shape to form a dish shape ring including such beveled flange on one side of such ring body.

11. The method of claim 10 further comprising the step of grinding a portion of one side of the ring body simultaneously with the other side of the ring body.

* * * * *